US008425672B2

(12) United States Patent
Schwartz et al.

(10) Patent No.: US 8,425,672 B2
(45) Date of Patent: Apr. 23, 2013

(54) GAS-SELECTIVE MEMBRANE AND METHOD OF ITS PRODUCTION

(75) Inventors: Vladimir Schwartz, Lexington, MA (US); Daniel Wetzig, Cologne (DE); Boris Chernobrod, Santa Fe, NM (US); Werner Grosse Bley, Bonn (DE)

(73) Assignee: Inficon GmbH, Bad Ragaz (CH)

( * ) Notice: Subject to any disclaimer, the term of this patent is extended or adjusted under 35 U.S.C. 154(b) by 0 days.

(21) Appl. No.: 13/571,851

(22) Filed: Aug. 10, 2012

(65) Prior Publication Data

US 2012/0304863 A1 Dec. 6, 2012

Related U.S. Application Data

(62) Division of application No. 12/757,611, filed on Apr. 9, 2010.

(51) Int. Cl.
*B01D 53/22* (2006.01)
(52) U.S. Cl.
USPC .............. 96/11; 96/4; 96/7; 95/53; 204/415
(58) Field of Classification Search ........... 95/53; 96/4, 96/7, 11; 204/415
See application file for complete search history.

(56) References Cited

U.S. PATENT DOCUMENTS

| 3,717,525 | A  | * | 2/1973  | Bültemann    | 156/77  |
| 3,880,684 | A  | * | 4/1975  | Abe          | 438/713 |
| 4,384,919 | A  | * | 5/1983  | Casey        | 216/12  |
| 5,335,256 | A  | * | 8/1994  | Maruyama et al. | 378/35 |
| 6,277,177 | B1 | * | 8/2001  | Bley et al.  | 96/4    |
| 6,405,066 | B1 | * | 6/2002  | Essenpreis et al. | 600/347 |
| 6,541,676 | B1 | * | 4/2003  | Franz et al. | 585/250 |
| 7,141,096 | B2 | * | 11/2006 | Carboneri et al. | 96/4 |
| 7,303,681 | B2 | * | 12/2007 | Sabottke et al. | 210/653 |
| 7,393,391 | B2 | * | 7/2008  | Lopez et al. | 96/11   |
| 7,922,795 | B2 | * | 4/2011  | Striemer et al. | 96/4 |
| 8,182,590 | B2 | * | 5/2012  | Striemer et al. | 96/4 |
| 2004/0245191 | A1 | * | 12/2004 | Yagi et al. | 210/791 |
| 2006/0037477 | A1 | * | 2/2006  | Lopez et al. | 96/11 |
| 2006/0230937 | A1 | * | 10/2006 | Smirnov et al. | 96/11 |
| 2006/0278580 | A1 | * | 12/2006 | Striemer et al. | 210/650 |

* cited by examiner

*Primary Examiner* — Jason M Greene
*Assistant Examiner* — Anthony Shumate
(74) *Attorney, Agent, or Firm* — Renner, Otto, Boisselle & Sklar, LLP

(57) ABSTRACT

A membrane selectively permeable to light gases comprises a membrane body formed by a first plate and a second plate. The second plate comprises a thin layer that is selectively gas-permeable. In the region of windows, this layer is exposed. There, support is provided by a porous bottom wall in the first plate or by narrow bores in the second plate. A heating device causes a radiation heating of the windows.

3 Claims, 3 Drawing Sheets

GAS-SELECTIVE MEMBRANE AND METHOD OF ITS PRODUCTION

RELATED APPLICATION

This application is a divisional of U.S. application Ser. No. 12/757,611 filed Apr. 9, 2010 which is incorporated herein by reference in its entirety.

BACKGROUND OF THE INVENTION

1. Field of the Invention

The invention refers to a method for the production of a membrane comprising selectively gas-permeable windows.

2. Description of the Prior Art

Selectively gas-permeable membranes are needed in measuring and analysis apparatuses in order to separate certain gases from other gases and to determine the presence of the interesting gases. A typical field of application of such membranes are leak detectors which detect a tracer gas flowing from a leak. Typical tracer gases are, among others, helium and hydrogen, which are light gases and pass through membranes that cannot be passed by heavier gases.

EP 0 831 964 B1 (Leybold Vacuum GmbH, =U.S. Pat. No. 6,277,177 B1) describes a selective gas passage formed by a plate of a silicon material such as quartz, quartz glass, Pyrex glass, silicon oxide, silicon nitride, silicon oxynitride, or silicon carbide, which is supported on a silicon disc with a plurality of windows. The windows have been made by structured etching of the silicon disc from the rear and they are covered by a thin membrane. Each of the windows is provided with a helical heating element for local heating of the gas passage. This structure of a gas-selective membrane is complex.

SUMMARY OF THE INVENTION

It is an object of the invention to provide a method for manufacturing a membrane with selectively gas-permeable windows and to provide a corresponding membrane simpler in design and in manufacturing.

According to the invention the membrane body is formed by a double plate made from two single silicon plates, with the gas-selectively permeable thin separating wall being located in the central region of the thickness of the membrane body. The first plate can be manufactured separately, with the layer having the selectivity properties being formed thereon, and may then be covered by the second plate and bonded therewith. The double plate gives the membrane body a great stability. Moreover, the bottom wall of the second plate, which forms the gas-selective separating wall, is protected against outside influences.

The windows may have inclined or conically tapered flank walls made by aniso-tropic etching.

The membrane can be manufactured using the same manufacturing techniques as described in EP 0 831 964 B1, such as deposition, oxidizing and other methods known from semiconductor technology.

The double plate provides the plate body with great stability overall, so that it is better adapted to withstand the different gas pressures usually prevailing on either side of the membrane.

The first plate may be formed with recesses or passages. With recesses, a bottom wall is left. Preferably, the same is porosified so that it is pervious to gas and will thereafter serve as a supporting wall for supporting the gas-selective layer. With passages, these are narrower than the recesses in the first (lower) plate in order to reduce the size of the non-supported membrane surfaces.

The invention further provides a gas-selective membrane wherein a heating device is a radiant heating element that heats all windows together, the silicon disc serving as a radiation absorber. Thus, an overall heating of the membrane is achieved, wherein a membrane structure with integrated heating conductors is not required. The radiant heating element may be an electrically heatable body and the membrane body may include a heat reflector layer in order to uniformly heat the membrane from both sides.

BRIEF DESCRIPTION OF THE DRAWINGS

A full and enabling disclosure of the present invention including the best mode thereof, enabling one of ordinary skill in the art to carry out the invention, is set forth in greater detail in the following description, including reference to the accompanying drawing in which.

DESCRIPTION OF PREFERRED EMBODIMENTS

Figure 1:
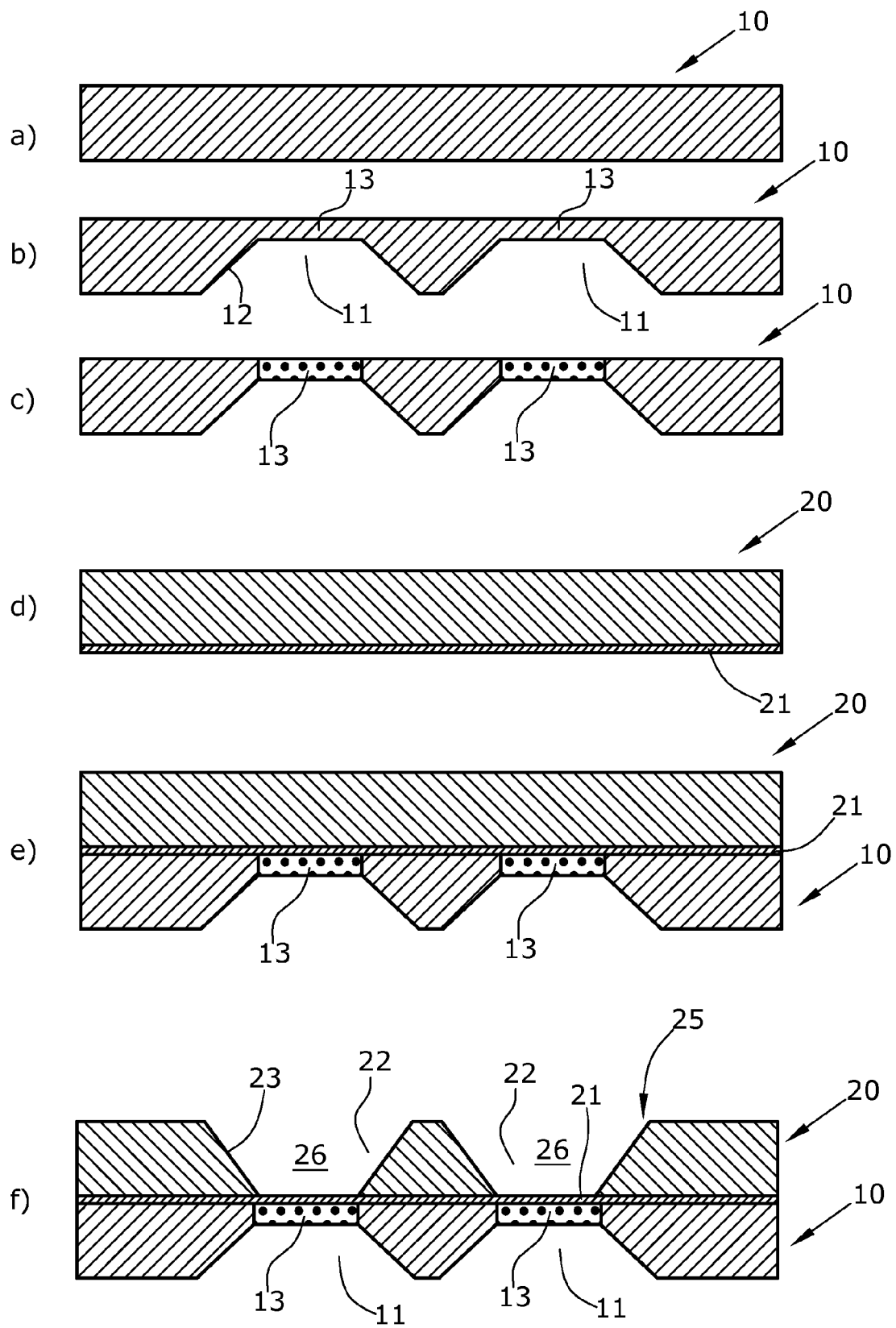
FIG. 1 illustrates the sequence of process steps for the manufacture of the membrane in a first embodiment of the invention.

In FIG. 1, a first plate 10 is illustrated under a), which plate is made of silicon and has a thickness of about 300 µm. This first plate is patterned on one side for instance by photochemical etching using KOH as the etchant, whereby the recesses 11 are formed. With anisotropic KOH etching, he recesses have inclined flanks 12 and a planar bottom wall 13 which is parallel to the plane of the plate. In a further step, the thin bottom walls are porosified such that they are pervious to gas.

Under c), FIG. 1 shows that the bottom walls 13 are porosified, whereby they are pervious to gas. The bottom walls 13, together with the top of the first plate, form a continuous surface as a support for the selectively gas-permeable layer.

FIG. 1d) illustrates the second plate 20 which is also made of silicon and has a thickness of about 300 µm. At first, the second plate is planar and bears the selectively gas-permeable layer 21 on its bottom face, the layer being a thin $SiO_2$ layer of about 12 nm in thickness. The layer 21 has grown thermally or has been formed by CVD/ALD deposition. According to the illustration e) in FIG. 1, the second plate 20 is placed over the first plate 10 and is bonded with the same, for instance by anodic bonding, wherein the layer 21 lies on the first plate 10 with its entire surface.

Under f), it is illustrated that the second plate 20 is provided with through holes 22 having inclined lateral flanks 23. The through holes extend through the entire silicon layer, but not through the layer 21 of $SiO_2$.

The entire membrane is formed by a membrane body 25 made up by the plates 10, 20, which membrane body has windows 26 in which the selectively gas-permeable layer 21 is exposed on one side and is supported on the opposite side by the porous bottom wall 13.

The selectively gas-permeable layer 21 is made from a silicon material, such as quartz, quartz glass, Pyrex glass, silicon oxide, silicon nitride, silicon oxynitride, or silicon carbide. This enumeration only gives examples and is not comprehensive. With such a thin layer, heavy gases can be blocked and light gases can be allowed to pass. Among such light gases are hydrogen and helium. Therefore, the membrane is particularly well suited for leak detectors, e.g. sniffer detectors, which operate with hydrogen or helium as the tracer gas.

Figure 2:
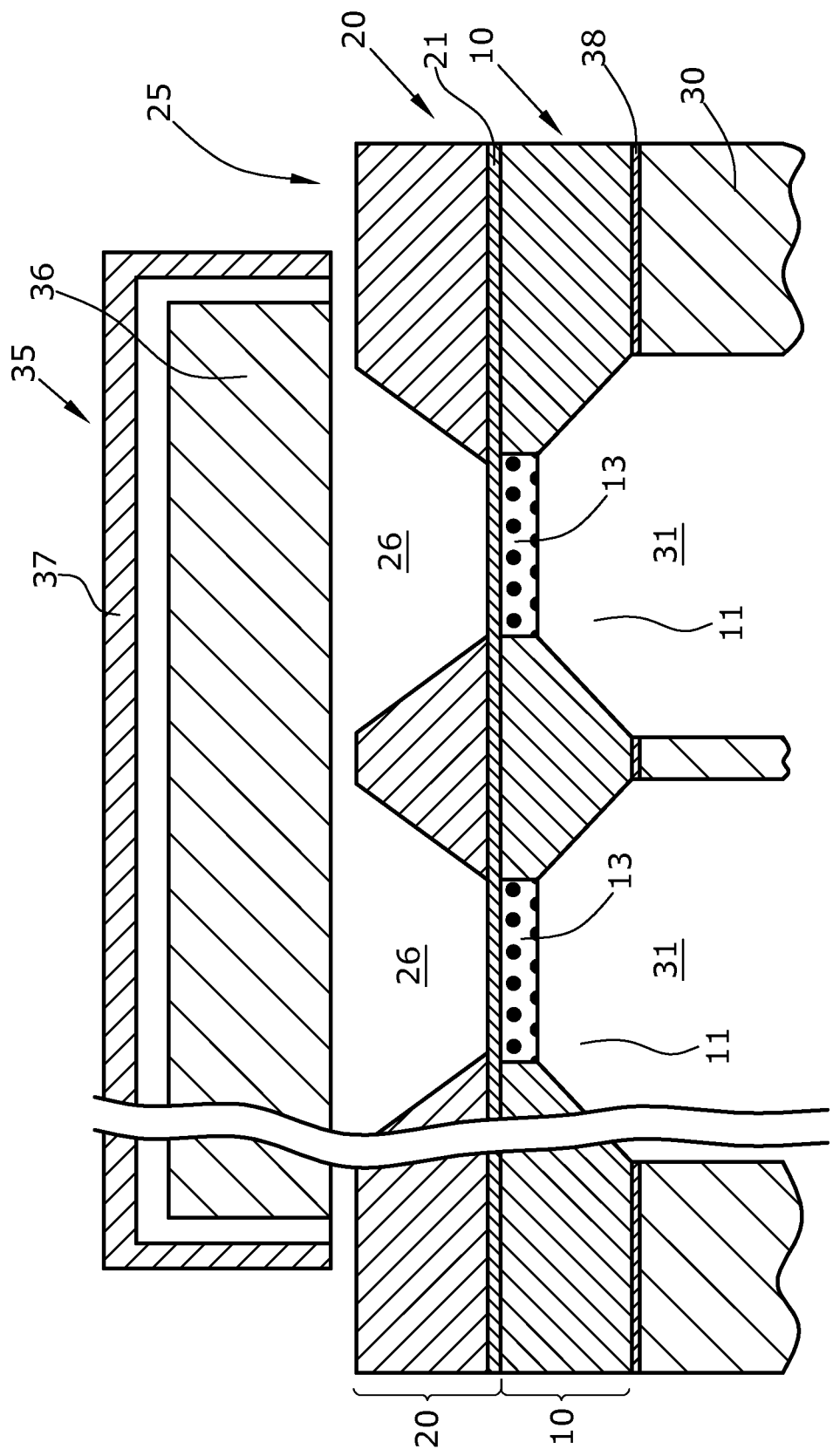
FIG. 2 illustrates a schematic cross section of the first embodiment with the membrane mounted on a support and a heating device being arranged above the membrane.

FIG. 2 illustrates the device of the first embodiment in the assembled state. The membrane body 25 is fastened on a supporting body 30 provided with pump openings 31 that are connected to a vacuum pump means (not illustrated).

Arranged at a distance from the second plate 20 of the membrane body 25 is a heating device 35 including a heating body 36 made from graphite and silicon carbide or another ceramic material. The heating body 36 is enclosed by a reflector 37 that directs the heat generated towards the membrane body 25, whereby the layer 21 is heated. The radiation heat is absorbed by all of the membrane body 25 and transferred to the layer 21. At the interface between the membrane body 25 and the supporting body 30, a heat reflecting layer 38 is provided that may consist of a layer of metal, preferably of gold.

Figure 3:
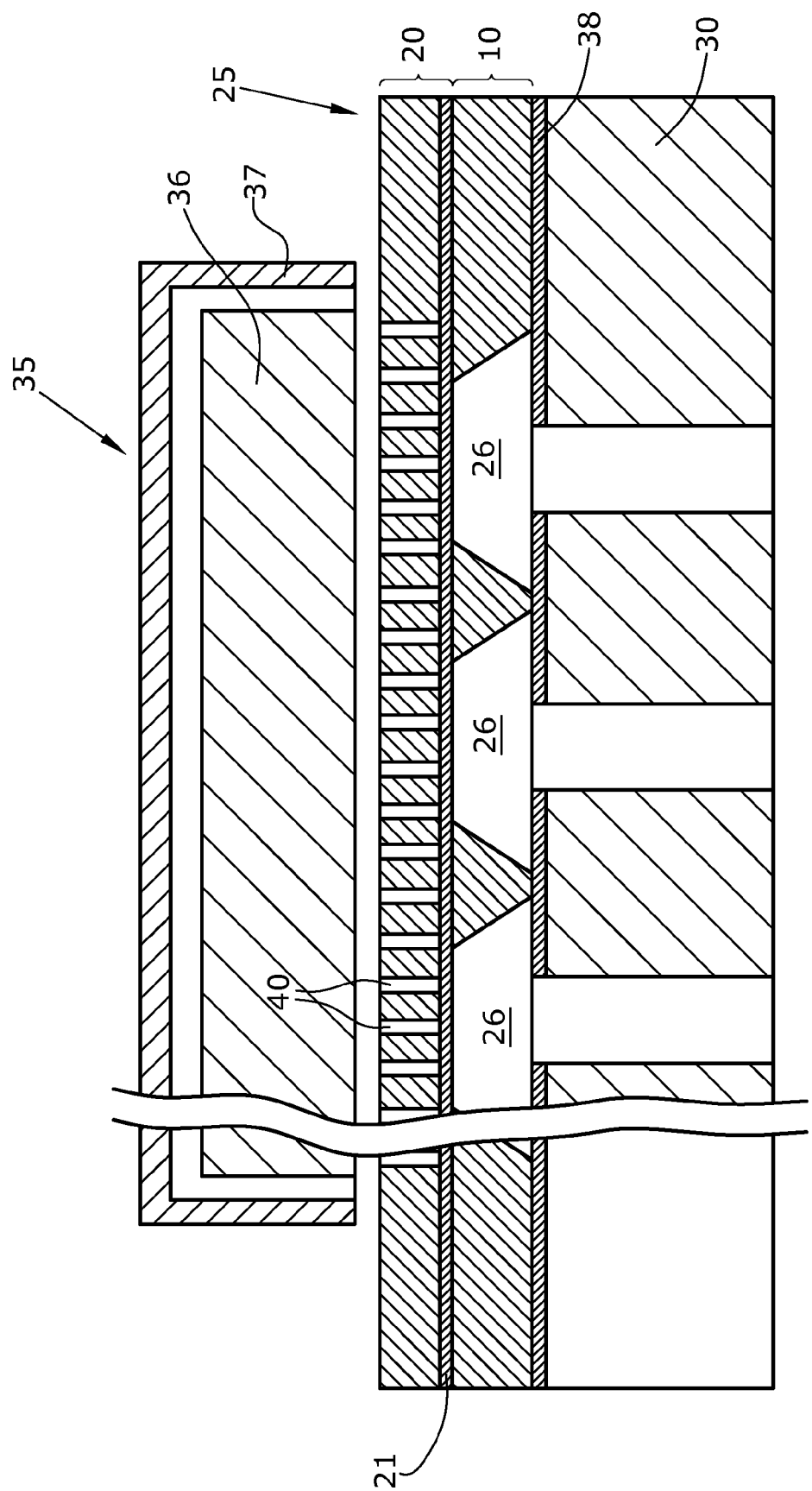
FIG. 3 illustrates a section through a second embodiment of the invention, wherein the first plate is provided with passages.

The embodiment of FIG. 3 differs from the first embodiment only in respectively different structures of the first plate 10 and the second plate 20. The layer 21 that forms the bottom face of the second plate 20 is exposed towards the first plate 10 in the region of the windows 26. On the other hand, the second plate 20 has recesses 40 extending through the silicon layer of the first plate but not penetrating the layer 21. The recesses 40 are fine holes with a diameter between 2 nm and 100 nm which may be made by electrochemical etching (anodization). The layer thickness of the layer 21 is 10 to 21 nm.

In the second embodiment, the layer 21 is supported at the top by the silicon of the second plate 20, whereas in the first embodiment (FIG. 2) the support is provided at the bottom face of the first plate 10.

FIG. 3 also shows a heat reflecting layer 38 between the supporting body 30 and the membrane body 25. Likewise, the heating device 35 is arranged opposite the second plate 20 and includes a heating body 36 and a reflector 37.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A gas-selective membrane with a membrane body having selectively gas-permeable windows in which a layer of silicon material is situated, and a heating device for heating the windows, wherein the heating device is formed by a radiation heating element that is spaced apart from a plurality of the gas-permeable windows for radiant heating the plurality of gas-permeable windows together, the membrane body serving as a radiation absorber.

2. The membrane of claim 1, wherein the heating body comprises an electrically heatable body.

3. A gas-selective membrane with a membrane body having selectively gas-permeable windows in which a layer of silicon material is situated, and a heating device for heating the windows, wherein the heating device is formed by a radiation heating element heating a plurality of windows together, the membrane body serving as a radiation absorber, wherein the membrane body comprises a heat reflecting layer.

* * * * *